W. BADGER.
Cotton-Planter.
No. 16,368.  Patented Jan 13, 1857.
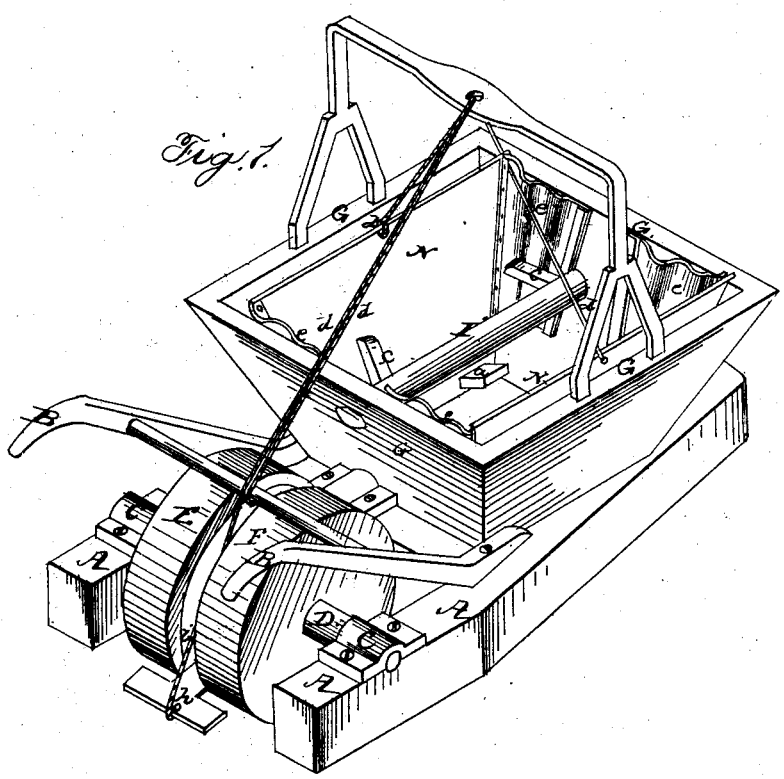
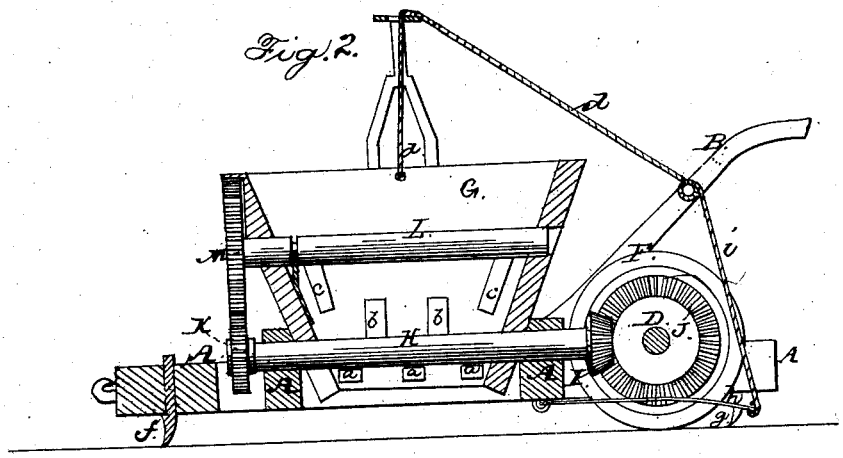

UNITED STATES PATENT OFFICE.

WILLIAM BADGER, OF MEMPHIS, TENNESSEE.

IMPROVEMENT IN COTTON-SEED PLANTERS.

Specification forming part of Letters Patent No. 16,368, dated January 13, 1857.

*To all whom it may concern:*

Be it known that I, WILLIAM BADGER, of Memphis, in the county of Shelby and State of Tennessee, have invented certain new and useful Improvements in Cotton-Seed Planters; and I do hereby declare the following to be a full, clear, and exact description of the same, reference being had to the accompanying drawings, making a part thereof, in which—

Figure 1 represents a perspective view of the entire machine, and Fig. 2 represents a longitudinal vertical section through the same.

Similar letters of reference, where they occur in the separate figures, denote the same parts of the machine in both.

Cotton-seed, from the amount of fiber that clings to it, cannot be made to run like ordinary seeds, and in planting it by machinery it must be forced apart to get the portion that is to be planted from the bulk in the hopper. This has been achieved by having rotating fingers, which project up into the hopper and draw down a quantity of the seed, which is drilled into the furrow; but a difficulty arises in this plan, viz: If the fingers are long enough to extend to the sides of the hopper, they take too much when the hopper is full and too little when it is nearly empty; and if the hopper is made so small as to only contain and present a small quantity to the fingers, then there is the constant delay of replenishing it. My object has been to overcome the defects in other machines for this purpose, and I believe I have effectually accomplished it by introducing into the hopper a secondary feeding contrivance for bringing the seeds in regulated quantities to the fingers or arms, which take it down through the hopper into the drill or furrow, thus preventing said fingers or arms from wading through a great bulk at one time and clogging their action, and through less quantities at other times, which makes irregular planting. Besides this the arms or fingers which I use may be short enough to catch and draw down a proper quantity at each rotation or partial rotation, while the seeds are brought up within reach of said fingers at proper intervals or in regulated quantities by the auxiliary feeding contrivance.

To enable others skilled in the art to make and use my invention, I will proceed to describe the same with reference to the drawings.

A is a frame, upon the rear end of which is supported in boxes C C an axle, D, said axle carrying two wheels, E F, of which E may be a supporting-wheel only, while the other one, F, may be both a supporting and a driving wheel.

G is a hopper, suitably affixed on the frame A, and B B are handles, also connected to the frame for guiding the machine. The bottom of the hopper is open, and may have arms or ribs $a\ a\ a$ projecting from its sides into said opening. A shaft, H, is placed longitudinally in the bottom of the hopper, which has upon it arms or projections $b\ b$, so set thereon as to pass through between those $a$ in the hopper. The rear end of the shaft H has a bevel-gear wheel or pinion, I, upon it, which takes into a bevel-gear, J, on the face of the wheel F, and receives a rotating motion from said wheel for the purpose of catching and carrying through the bottom of the hopper the seeds to be planted. On the front end of the shaft H is a pinion, K, which meshes with the gear M and gives motion to another shaft, L, placed longitudinally through the hopper and above the shaft H, said gear M being on the front end of shaft L. The shaft L is also provided with arms or fingers $c\ c$, for catching and carrying down to the shaft H below it the cotton-seeds, which must from their character have a forced feed, as they will not drop or run by themselves. This will bring all the overlying seeds down within reaching distance of the lower arms, $b\ b$. It remains now to bring in the seeds from the sides of the hopper. This is accomplished as follows: Two false sides, N N, are made in the hopper and united to the ends of the hopper by elastic cloth $e$ or leather of any kind and hinged near their bottoms. To these sides a cord, $d$, is attached, (or other equivalent device,) which extend back into convenient position for the operator of the machine to catch hold of, so that at any time, by drawing said cords, he can force the seeds from the sides to the center of the hopper and within reach of the arms $c$.

The front of the frame may have a tooth, $f$, affixed to it for opening a furrow, and the rear of the frame may have covering-shoes $g$ arranged upon it for moving the earth over the seeds planted or dropped in said furrow. The covering-shoes may be hung on a spring-beam, $h$, or a hinged one, so that by a cord, $i$, or otherwise they may be raised up out of the way of obstacles of any kind.

Having thus fully described the nature of my invention, what I claim therein as new, and desire to secure by Letters Patent, is—

In combination with one or more sets of feeding-arms centrally located in the hopper, the false sides in the hopper for drawing or forcing the cotton-seeds up to said feeding-arms, substantially as set forth.

WILLIAM BADGER.

Witnesses:
R. M. HORSEY,
A. C. BETTIS.